(12) United States Patent
Matsuo

(10) Patent No.: US 8,437,093 B2
(45) Date of Patent: May 7, 2013

(54) PROJECTION LENS SYSTEM AND PROJECTOR APPARATUS

(75) Inventor: Takahiko Matsuo, Suwa (JP)

(73) Assignee: Nittoh Kogaku K.K., Suwa-shi, Jagano (JP)

(*) Notice: Subject to any disclaimer, the term of this patent is extended or adjusted under 35 U.S.C. 154(b) by 0 days.

(21) Appl. No.: 13/444,473

(22) Filed: Apr. 11, 2012

(65) Prior Publication Data

US 2012/0262803 A1      Oct. 18, 2012

(30) Foreign Application Priority Data

Apr. 13, 2011   (JP) .................................. 2011-89088

(51) Int. Cl.
  *G02B 9/12*      (2006.01)
  *G02B 3/02*      (2006.01)

(52) U.S. Cl.
  USPC .......................................... 359/784; 359/716

(58) Field of Classification Search .................. 359/716, 359/784

See application file for complete search history.

(56) References Cited

FOREIGN PATENT DOCUMENTS

JP      2005-030608      2/2005

*Primary Examiner* — Jack Dinh
(74) *Attorney, Agent, or Firm* — Thompson Hine LLP

(57) ABSTRACT

A projection lens system has first, second and third lens groups. The first lens group with combined focal length f1 has, in order from a screen side, a first negative meniscus lens, a second negative meniscus lens with focal length f12, refractive index n12 and screen side surface radius of curvature R12$a$, and a negative biconcave lens with focal length f13. A second lens group consists of a positive biconvex lens with a radius of curvature R21$b$ of a surface on a light modulator side of the positive biconvex lens. The system satisfies the following conditions: $1.0<|f12/f1|<4.0$; $5.0<|f13/f1|<9.0$; $1.75<n12<2.0$; and $0.1<|R21b/R12a|<0.8$.

8 Claims, 12 Drawing Sheets

Fig. 3

| Lens surface number | Ri | di | Di | nd | νd | Lens ID | | Focal length | |
|---|---|---|---|---|---|---|---|---|---|
| | | | | | | | | Lens | Group |
| Screen | Flat | 980.00 | | | | | | | |
| 1 | 133.48 | 4.00 | 70.2 | 1.5311 | 55.8 | L11 | | -40.4 | -6.9 |
| 2 | 18.72 | 18.17 | 49.0 | | | | | | |
| 3 | 102.32 | 1.50 | 34.2 | 1.8010 | 35.0 | L12 | | -23.4 | |
| 4 | 15.34 | 10.78 | 25.2 | | | | | | |
| 5 | -85.00 | 2.80 | 23.4 | 1.5311 | 55.8 | L13 | | -41.6 | |
| 6 | 33.18 | 9.08 | 22.6 | | | | | | |
| 7 | 115.81 | 6.60 | 24.6 | 1.7205 | 34.7 | L21 | | 32.2 | |
| 8 | -31.47 | 11.73 | 24.8 | | | | | | |
| Flare aperture | Flat | 0.00 | 16.8 | | | | | | |
| 9 | 23.02 | 9.20 | 16.4 | 1.7552 | 27.5 | L31 | L3B1 | 11.6 | -38.1 |
| 10 | -12.22 | 3.00 | 13.8 | | | | | | |
| 11 | 14.98 | 0.80 | 11.8 | 1.9037 | 31.3 | L32 | | -7.3 | |
| 12 | 14.84 | 5.20 | 11.8 | 1.5317 | 48.8 | L33 | | 15.6 | 29.9 |
| 13 | -14.84 | 0.20 | 11.2 | | | | | | |
| 14 | 24.06 | 3.50 | 9.9 | 1.4388 | 94.9 | L34 | L3B2 | 20.7 | 181.6 |
| 15 | -13.74 | 0.70 | 10.2 | 1.9037 | 31.3 | L35 | | -7.7 | |
| 16 | 13.03 | 4.70 | 11.1 | | | | | | |
| 17 | -19.05 | 20.00 | 12.3 | 1.6584 | 50.9 | L36 | | 13.2 | |
| 18 | Flat | 1.05 | | 1.4875 | 70.2 | Cover glass | | | |
| 19 | Flat | 2.61 | | | | | | | |
| Light valve | Flat | | | | | | | | |

Fig. 4A

| Focal length | F number | Half angle | Maximum image height |
|---|---|---|---|
| 7.11 | 2.79 | 57.1 | 11.0 |

Fig. 4B

| | K | A | B | C | D | E |
|---|---|---|---|---|---|---|
| S1 | 0.0000 | 3.8287E-06 | 1.2805E-09 | -1.6149E-12 | 9.3044E-16 | 0.0000E+00 |
| S2 | -0.5782 | -1.4833E-05 | 5.6909E-09 | 2.0279E-11 | -5.4263E-14 | 0.0000E+00 |
| S5 | 0.0000 | -8.9231E-05 | 7.9123E-07 | -4.3386E-09 | 1.2178E-11 | -1.5860E-14 |
| S6 | 0.0000 | -3.8363E-05 | 7.7939E-07 | -4.6087E-09 | 1.2680E-11 | -1.4704E-14 |

Fig. 7

| Lens surface number | Ri | di | Di | nd | νd | Lens ID | | Focal length | |
|---|---|---|---|---|---|---|---|---|---|
| | | | | | | | | Lens | Group |
| Screen | Flat | 980.00 | | | | | | | |
| 1 | 126.22 | 3.00 | 70.4 | 1.5311 | 55.8 | L11 | | −41.3 | −6.8 |
| 2 | 18.25 | 19.36 | 49.9 | | | | | | |
| 3 | 113.32 | 1.50 | 34.4 | 1.8010 | 35.0 | L12 | | −22.6 | |
| 4 | 16.05 | 9.02 | 25.6 | | | | | | |
| 5 | −85.00 | 2.80 | 24.8 | 1.5311 | 55.8 | L13 | | −44.4 | |
| 6 | 30.40 | 8.60 | 23.6 | | | | | | |
| 7 | 74.12 | 6.50 | 26.5 | 1.7205 | 34.7 | L21 | | 34.8 | |
| 8 | −32.77 | 14.30 | 26.6 | | | | | | |
| Flare aperture | Flat | 0.00 | 16.8 | | | | | | |
| 9 | 24.96 | 8.90 | 16.6 | 1.7552 | 27.5 | L31 | L3B1 | 11.8 | −38.1 |
| 10 | −11.50 | 1.20 | 14.7 | | | | | | |
| 11 | 16.56 | 0.80 | 13.6 | 1.9037 | 31.3 | L32 | | −7.0 | |
| 12 | 16.42 | 5.80 | 14.0 | 1.5317 | 48.8 | L33 | | 14.8 | 28.9 |
| 13 | −14.83 | 0.20 | 13.9 | | | | | | |
| 14 | 23.47 | 3.80 | 12.0 | 1.4388 | 94.9 | L34 | L3B2 | 20.5 | 181.6 |
| 15 | −14.18 | 0.70 | 11.6 | 1.9037 | 31.3 | L35 | | −7.3 | |
| 16 | 14.27 | 4.60 | 11.9 | | | | | | |
| 17 | −19.63 | 20.00 | 12.4 | 1.6584 | 50.9 | L36 | | 12.4 | |
| 18 | Flat | 1.05 | | 1.4875 | 70.2 | Cover glass | | | |
| 19 | Flat | 2.60 | | | | | | | |
| Light valve | Flat | | | | | | | | |

Fig. 8A

| Focal length | F number | Half angle | Maximum image height |
|---|---|---|---|
| 7.12 | 2.30 | 57.0 | 11.0 |

Fig. 8B

| | K | A | B | C | D | E |
|---|---|---|---|---|---|---|
| S1 | 0.0000 | 3.5086E−06 | 1.4702E−09 | −1.6369E−12 | 8.9497E−16 | 0.0000E+00 |
| S2 | −0.6051 | −1.4532E−05 | 3.1061E−09 | 2.5286E−11 | −5.6700E−14 | 0.0000E+00 |
| S5 | 0.0000 | −7.1828E−05 | 7.2126E−07 | −4.7793E−09 | 1.7628E−11 | −2.9685E−14 |
| S6 | 0.0000 | −1.5731E−05 | 6.9530E−07 | −4.8860E−09 | 1.7603E−11 | −2.8928E−14 |

Fig. 11

| Lens surface number | Ri | di | Di | nd | νd | Lens ID | | Focal length | |
|---|---|---|---|---|---|---|---|---|---|
| | | | | | | | | Lens | Group |
| Screen | Flat | 980.00 | | | | | | | |
| 1 | 106.36 | 4.00 | 69.1 | 1.5311 | 55.8 | L11 | | -37.4 | -7.0 |
| 2 | 16.58 | 16.56 | 47.4 | | | | | | |
| 3 | 79.87 | 1.50 | 35.5 | 1.8010 | 35.0 | L12 | | -25.2 | |
| 4 | 16.08 | 11.12 | 26.2 | | | | | | |
| 5 | -73.73 | 2.30 | 24.0 | 1.5311 | 55.8 | L13 | | -42.7 | |
| 6 | 33.26 | 10.60 | 22.7 | | | | | | |
| 7 | 288.86 | 6.00 | 25.5 | 1.6727 | 32.1 | L21 | | 39.8 | |
| 8 | -29.47 | 10.55 | 25.9 | | | | | | |
| Flare aperture | Flat | 0.00 | 20.4 | | | | | | |
| 9 | 22.00 | 6.60 | 19.4 | 1.6668 | 33.1 | L31 | | 27.7 | 31.0 |
| 10 | -106.05 | 1.87 | 16.9 | | | | | | |
| 11 | 722.72 | 8.50 | 13.8 | 1.9037 | 31.3 | L32 | L3B1 | -11.6 | -49.8 |
| 12 | 10.34 | 3.97 | 9.8 | | | | | | |
| 13 | -20.57 | 0.40 | 9.4 | 1.4388 | 94.9 | L33 | | 16.3 | |
| 14 | 258.84 | 3.20 | 8.8 | 1.5955 | 39.2 | L34 | L3B2 | 12.6 | -44.8 |
| 15 | -7.75 | 0.60 | 9.5 | | | | | | |
| 16 | -59.80 | 0.25 | 10.7 | 1.9037 | 31.3 | L35 | | -9.8 | |
| 17 | 206.01 | 3.80 | 11.3 | 1.4388 | 94.9 | L36 | | 22.8 | |
| 18 | -10.50 | 20.00 | 12.4 | | | | | | |
| 19 | Flat | 1.05 | | 1.4875 | 70.2 | Cover glass | | | |
| 20 | Flat | 2.64 | | | | | | | |
| Light valve | Flat | | | | | | | | |

Fig. 12A

| Focal length | F number | Half angle | Maximum image height |
|---|---|---|---|
| 7.18 | 2.80 | 57.0 | 11.0 |

Fig. 12B

| | K | A | B | C | D | E |
|---|---|---|---|---|---|---|
| S1 | 0.0000 | 3.5668E-06 | -1.3594E-10 | -3.9741E-13 | 5.6209E-16 | 0.0000E+00 |
| S2 | -0.6931 | -1.1542E-05 | 2.9939E-09 | -2.8184E-11 | 7.4467E-17 | 0.0000E+00 |
| S5 | 0.0000 | -2.7190E-05 | -3.4463E-08 | -4.7444E-10 | 8.5185E-12 | -2.6008E-14 |
| S6 | 3.2795 | 1.4175E-05 | 2.4450E-07 | -4.5331E-09 | 3.8376E-11 | -1.1258E-13 |

Fig. 15

| Lens surface number | R i | d i | D i | n d | ν d | Lens ID | | Focal length | |
|---|---|---|---|---|---|---|---|---|---|
| | | | | | | | | Lens | Group |
| Screen | Flat | 980.00 | | | | | | | |
| 1 | 128.72 | 3.00 | 71.4 | 1.5311 | 55.8 | L 1 1 | | -42.0 | -9.4 |
| 2 | 18.91 | 19.04 | 51.5 | | | | | | |
| 3 | 127.74 | 1.50 | 36.4 | 1.8010 | 35.0 | L 1 2 | | -32.4 | |
| 4 | 21.58 | 10.81 | 28.6 | | | | | | |
| 5 | -85.00 | 2.80 | 23.0 | 1.5311 | 55.8 | L 1 3 | | -60.5 | |
| 6 | 52.62 | 17.69 | 19.8 | | | | | | |
| 7 | 357.85 | 6.00 | 14.4 | 1.8467 | 23.8 | L 2 1 | | 40.8 | |
| 8 | -38.32 | 3.84 | 14.9 | | | | | | |
| Stop | Flat | 7.31 | 14.4 | | | | | | |
| 9 | 50.47 | 6.00 | 16.3 | 1.8081 | 22.8 | L 3 1 | L 3 B 1 | 15.4 | 32.5 |
| 10 | -15.82 | 1.00 | 16.2 | | | | | -48.9 | |
| 11 | 27.65 | 1.00 | 16.6 | 1.9037 | 31.3 | L 3 2 | | -10.9 | |
| 12 | 31.06 | 5.00 | 18.0 | 1.4970 | 81.5 | L 3 3 | | 26.3 | |
| 13 | -21.43 | 0.10 | 18.8 | | | | | | |
| 14 | 47.33 | 0.80 | 19.7 | 1.8467 | 23.8 | L 3 4 | | -28.3 | |
| 15 | 15.87 | 10.46 | 19.6 | 1.4388 | 94.9 | L 3 5 | L 3 B 2 | 19.1 | -88.7 |
| 16 | -14.25 | 0.80 | 20.8 | | | | | | |
| 17 | -31.11 | 0.10 | 23.2 | 1.9037 | 31.3 | L 3 6 | | -29.6 | |
| 18 | 104.46 | 8.20 | 25.6 | 1.4970 | 81.5 | L 3 7 | | 36.5 | |
| 19 | -21.44 | 5.00 | 26.7 | | | | | | |
| 20 | Flat | 25.00 | | 1.5168 | 64.2 | Cover glass | | | |
| 21 | Flat | 4.50 | | | | | | | |
| Light valve | Flat | | | | | | | | |

Fig. 16A

| Focal length | F number | Half angle | Maximum image height |
|---|---|---|---|
| 7.11 | 2.31 | 57.0 | 11.0 |

Fig. 16B

| | K | A | B | C | D | E |
|---|---|---|---|---|---|---|
| S1 | 0.0000 | 3.5086E-06 | 1.4702E-09 | -1.6369E-12 | 8.9497E-16 | 0.0000E+00 |
| S2 | -0.5699 | -1.4532E-05 | 3.1061E-09 | 2.5286E-11 | -5.6700E-14 | 0.0000E+00 |
| S5 | 0.0000 | 1.8405E-05 | -1.9751E-09 | 3.3673E-09 | -4.5267E-11 | 1.5211E-13 |
| S6 | 0.0000 | 1.1240E-04 | -1.2177E-06 | 3.3299E-08 | -3.4752E-10 | 1.2824E-12 |

PROJECTION LENS SYSTEM AND PROJECTOR APPARATUS

CROSS-REFERENCE TO RELATED APPLICATIONS

This application is based upon and claims the benefit of priority from the prior Japanese Patent Application No. 2011-89088, filed Apr. 13, 2011, the entire contents of which are incorporated herein by reference.

BACKGROUND

The present invention relates to a projection lens system of a projector apparatus.

Japanese Laid-Open Patent Publication No. 2006-215476 discloses a compact, wide-angle projection lens system that is suited to a light modulator, such as a DMD, equipped with a plurality of elements that generate an image by changing the direction of reflection of light. Publication No. 2006-215476 states that by using a arrangement where a negative first lens group and a positive second lens group are disposed in that order from the screen side, where the incident side is non-telecentric, where a pair of doublet cemented lenses with positive refractive power and with the cemented surfaces facing in opposite directions are disposed on the screen side of the second lens group, and where a triplet cemented lens with positive refractive power is disposed on the light valve side, it is possible to effectively correct curvature of field and provide a wide-angle projection lens system that is compact and has a half angle of view of 47 degrees or wider.

In applications such as presentations and education, there is demand for a projection lens system that is more compact and is even wider.

SUMMARY

One aspect of the present invention is a projection lens system that projects projection light from a light modulator onto a screen. This projection lens system includes, in order from the screen side thereof, a first lens group with negative refractive power, a second lens group with positive refractive power, and a third lens group with positive refractive power. The first lens group includes, in order from the screen side, a first negative meniscus lens that is made of resin and is convex on the screen side, a second negative meniscus lens that is made of glass and is convex on the screen side, and a negative biconcave lens made of resin, both surfaces of the first negative meniscus lens and of the negative biconcave lens being aspherical. The second lens group consists of a positive biconvex lens made of glass. A combined focal length f1 of the first lens group, a focal length f12 of the second negative meniscus lens of the first lens group, a focal length f13 of the negative biconcave lens of the first lens group, a refractive index n12 of the second negative meniscus lens of the first lens group, a radius of curvature R12a of a surface on the screen side of the second negative meniscus lens of the first lens group, and a radius of curvature R21b of a surface on the light modulator side of the positive lens of the second lens group satisfy Conditions (1) to (4) below.

$$1.0 < |f12/f1| < 4.0 \quad (1)$$

$$5.0 < |f13/f1| < 9.0 \quad (2)$$

$$1.75 < n21 < 2.0 \quad (3)$$

$$0.1 < |R21b/R12a| < 0.8 \quad (4)$$

This projection lens system has a negative-positive-positive three-group arrangement and by making the three lenses of the first lens group that is closest to the screen, i.e., on the enlargement conjugate side, and is where the lens aperture (stop) is comparatively large respectively out of resin, glass, and resin lenses in that order, a low-cost, wide-angle, and compact projection lens system is provided.

That is, since the negative refractive power would be insufficient if all three lenses were made of resin to reduce cost, the diameters of the lenses, and in particular the diameter of the lens closest to the screen, would increase, which would make it difficult to provide a compact projection lens system. If the focal length of every lens were made shorter to make the lens system compact, using resin for every lens would mean an increase in curvature, which is undesirable since it makes it difficult to correct aberration and increases the temperature-based variation in lens performance.

In this projection lens system, by making the second negative meniscus lens of the first lens group a glass lens with high refractive power, it is possible to make the effective diameters of the two resin lenses in front and behind comparatively smaller. In addition, it is possible, without increasing the curvature of the two resin lenses in front and behind, to provide a projection lens system that is compact and favorably corrects aberration.

In addition, in this projection lens system, by setting the power of the second negative meniscus lens made of glass stronger as indicated by Condition (1), the power of the negative lens made of resin can be made weaker as shown by Condition (2), which suppresses temperature-based variation in lens performance, particularly variation in the back focus. Also, when the power of the second negative meniscus lens has been increased, by using a glass material with a high refractive index as shown by Condition (3), it is possible to avoid a large increase in curvature, which suppresses the production of aberration.

That is, in this projection lens system, if the upper limit of Condition (1) is exceeded, the power of the second negative meniscus lens out of the total power of the first lens group becomes weak, which makes it difficult to set the power of the negative lens which is made of resin as weak relative to the power of the first lens group as in the range shown in Condition (2). Accordingly, it becomes difficult to provide a projection lens system that is wide angle and has little variation in back focus due to temperature variation. Also, although it is preferable for the refractive index n12 of the second negative meniscus lens to be high, by keeping the refractive index n12 within the range of Condition (3), it is possible to prevent excessively high dispersion and to favorably correct chromatic aberration.

In this projection lens system, since the second negative meniscus lens has high negative refractive power, there is a tendency for aberration to occur in the direction of divergence. Further, in this projection lens system, the radius of curvature R21b of the surface on the light modulator side of the positive lens of the second lens group which is the closest surface on the reduction conjugate side to the surface on the screen side of the second negative meniscus lens to be set smaller (i.e., for the curvature to be higher) relative to the radius of curvature R12a of the surface on the screen side of the second negative meniscus lens, or in other words, within the range of Condition (4). The aberration is produced in the opposite direction (that is, the direction of convergence) by the surface on the light modulator side of the positive lens of the second lens group and the aberration of the second negative meniscus lens can be favorably corrected.

In this projection lens system, Conditions (1') to (4') should preferably also be satisfied.

$$2.0<|f12/f1|<3.5 \quad (1')$$

$$6.0<|f13/f1|<8.0 \quad (2')$$

$$1.80<n12<2.0 \quad (3')$$

$$0.2<|R21b/R12a|<0.5 \quad (4')$$

In this projection lens system, a thickness t11c at the center of the first negative meniscus lens of the first lens group and a thickness t11e at an end of an effective diameter of a surface on the light modulator side of the first negative meniscus lens of the first lens group should preferably satisfy Condition (5) below.

$$4.0 \leq t11e/t11c \leq 5.0 \quad (5)$$

By designing the projection lens system to satisfy the range of Condition (5), it is possible to favorably correct various aberrations including astigmatism. If the upper limit of Condition (5) is exceeded, the thickness t11e at the end of the effective diameter of the first negative meniscus lens becomes large relative to the center thickness t11c and since the difference in the amount of light absorbed inside the lens becomes large between the center and the periphery, there is a significant drop in peripheral brightness. On the other hand, if the lower limit of Condition (5) is exceeded, the thickness t11e at the end of the effective diameter of the first negative meniscus lens becomes small relative to the center thickness t11c, which makes it difficult to correct various aberrations including astigmatism.

The third lens group should preferably include a first cemented lens, a second cemented lens and a first positive biconvex lens. By disposing a plurality of cemented lenses in the third lens group, chromatic aberration correction performance is improved on the reduction conjugate side. For this reason, the chromatic aberration correcting performance of the first lens group is favorably complemented, and a lens made of high-dispersion glass with an even higher refractive index can be used as the second negative meniscus lens. Accordingly, it is possible to construct a first lens group suited to a more compact and wide angle lens system.

The first cemented lens can be disposed on the screen side of the first positive lens with one (1) air gap in between, then the second cemented lens is disposed on the light modulator side of the first positive lens with at least one air gap in between. The first cemented lens includes, in order from the screen side, a positive biconvex lens and a negative biconcave lens, and that a radius of curvature R32b of a surface on the light modulator side of the negative lens of the first cemented lens and the radius of curvature R33a of a surface on the screen side of the first positive biconvex lens of the third lens group satisfy Condition (6) below.

$$0.89<R32b/R33a<1.01 \quad (6)$$

By designing the projection lens system so that the radii of curvature of the facing surfaces of the negative lens and the positive lens that are adjacent with one air gap in between are within the range of Condition (6), the two surfaces that have substantially the same radii of curvature can be aligned with the same orientation. This means it is possible to achieve significantly more favorable correcting performance for various aberrations including comatic aberration.

The second cemented lens may include, in order from the screen side, a negative meniscus lens that is convex on the screen side, a positive biconvex lens, and a negative meniscus lens that is convex on the light modulator side, and the third lens group may include a second positive biconvex lens that is disposed on the light modulator side of the second cemented lens.

The first cemented lens may be disposed on the light modulator side of the first positive lens and the second cemented lens may be disposed on the light modulator side of the first cemented lens, the first cemented lens may include, in order from the screen side, a negative meniscus lens that is convex on the screen side and a positive biconvex lens, the second cemented lens may include, in order from the screen side, a positive biconvex lens and a negative meniscus lens that is convex on the light modulator side, and the third lens group may further include a second biconvex positive lens that is disposed on the light modulator side of the second cemented lens.

Another aspect of the present invention is a projector including: the projection lens system described above; and the light modulator that modulates illumination light and supplies the modulated illumination light to the projection lens system.

BRIEF DESCRIPTION OF THE DRAWINGS

FIG. 3 is a table showing lens data of the projection lens system according to the first embodiment;

FIGS. 4A and 4B show various numeric values of the projection lens system according to the first embodiment, with FIG. 4A showing basic data and FIG. 4B showing aspherical surface data;

FIG. 7 is a table showing lens data of the projection lens system according to the second embodiment;

FIGS. 8A and 8B show various numeric values of the projection lens system according to the second embodiment, with FIG. 8A showing basic data and FIG. 8B showing aspherical surface data;

FIG. 11 is a table showing lens data of the projection lens system according to the third embodiment;

FIGS. 12A and 12B show various numeric values of the projection lens system according to the third embodiment, with FIG. 12A showing basic data and FIG. 12B showing aspherical surface data;

FIG. 15 is a table showing lens data of the projection lens system according to the fourth embodiment;

FIGS. 16A and 16B show various numeric values of the projection lens system according to the fourth embodiment, with FIG. 16A showing basic data and FIG. 16B showing aspherical surface data.

DETAILED DESCRIPTION

Figure 1:
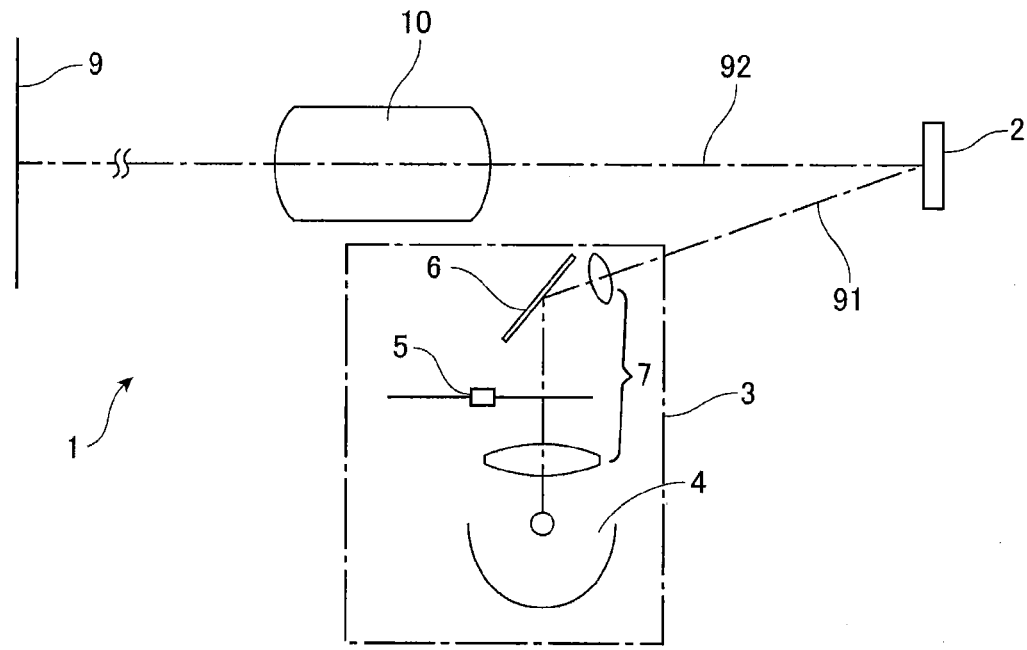
FIG. 1 is a diagram showing the overall construction of a projector that uses a projection lens system according to the present invention.

FIG. 1 schematically shows a projector that uses a typical projection lens system according to an embodiment of the present invention. The projector (projector apparatus) 1 includes a light modulator (light valve) 2, a light emitting system 3 that emits illumination light 91 to be modulated by the light valve 2, and a projection lens system 10 that projects projection light 92 that has been reflected in an effective direction by the light valve 2 to project the light onto a screen 9. This projector 1 is a single-panel video projector that uses a DMD (digital mirror device) as the light valve 2 and the light emitting system 3 includes a white light source 4 such as a halogen bulb and a disc-shaped rotating color splitting filter (or "color wheel") 5. Light of the three primary colors red, green, and blue become incident on the DMD (light valve) 2 according to time division. By controlling elements that correspond to individual pixels at the timing when the light of the respective colors is incident, a color image is displayed. The light emitting system 3 further includes an illumination lens system 7 that collects the light from the white light source 4 and outputs the non-telecentric illumination light 91 via a mirror 6 or the like to the DMD 2.

First Embodiment

Figure 2:
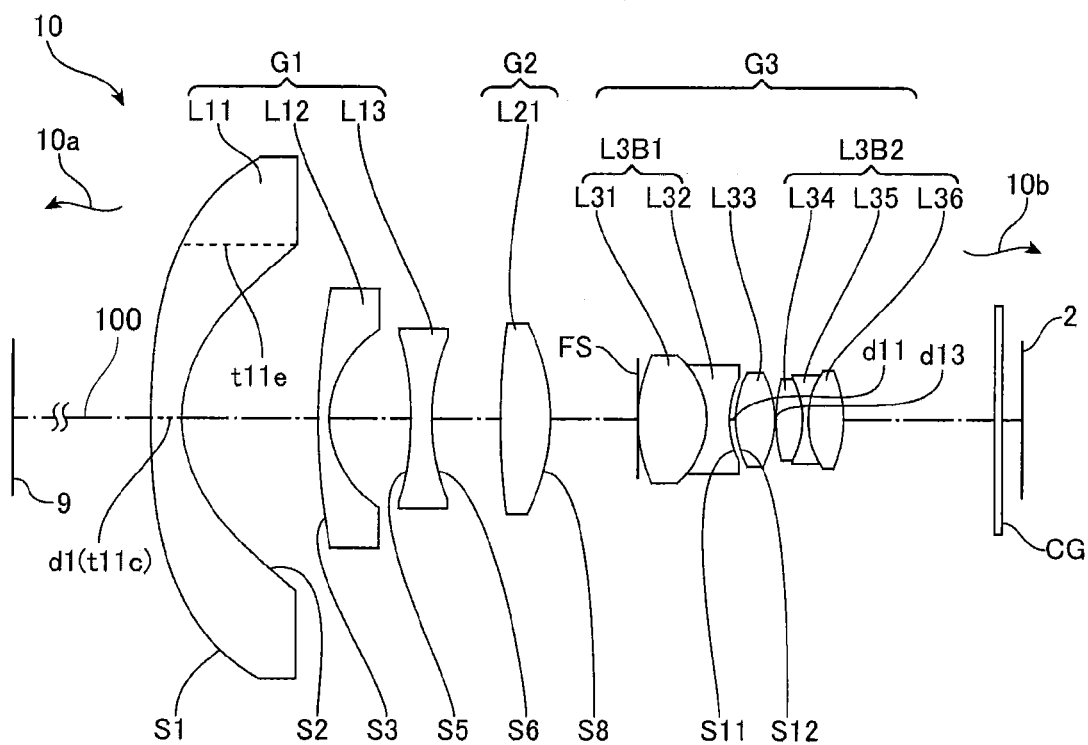
FIG. 2 is a diagram showing the overall arrangement of a projection lens system according to a first embodiment of the present invention.

FIG. 2 shows a projection lens system 10 according to a first embodiment of the present invention. This projection lens system 10 includes lenses that consists of, in order from a side near or to the screen (screen side), a first lens group G1 with negative refractive power, a second lens group G2 with positive refractive power, and a third lens group G3 with positive refractive power.

The first lens group G1 that is closest to the screen 9 has an overall negative refractive power and is composed, in order from the screen side, of a first negative meniscus lens L11 that is made of resin and is convex on the screen side, a second negative meniscus lens L12 that is made of glass and is convex on the screen side, and a negative biconcave lens L13 that is made of resin. Both surfaces of the first negative meniscus lens L11, that is, the surface S1 on the screen side and the surface S2 on a side near or to the DMD 2 (DMD side) are aspherical. In addition, both surfaces of the negative lens L13, that is, the surface S5 on the screen side and the surface S6 on the DMD side are aspherical. The first negative meniscus lens L11 of the first lens group G1 is the lens with the largest effective diameter (aperture) out of the projection lens system 10.

The second lens group G2 has an overall positive refractive power and is composed of a positive biconvex lens L21 that is made of glass.

The third lens group G3 that is closest to the DMD 2 has an overall positive refractive power and is composed, in order from the screen 9 side, of a first cemented lens (balsam lens, doublet) L3B1 composed of two lenses cemented together, a positive biconvex lens (first positive lens) L33, and a second cemented lens (balsam lens, triplet) L3B2 composed of three lenses cemented together. The first cemented lens L3B1 is composed, in order from the screen side, of a positive biconvex lens L31 and a negative biconcave lens L32. The second cemented lens L3B2 is composed, in order from the screen side, of a positive biconvex lens L34, a negative biconcave lens L35, and a positive biconvex lens L36. The third lens group G3 includes the positive lens L34 that is the lens with the smallest effective diameter (aperture) out of the projection lens system 10. A flare stop FS is disposed on the screen side of the third lens group G3 and blocks scattered light (unnecessary light) that could cause flare and ghosts. A cover glass CG composed of a single sheet of glass is disposed on the DMD side of the third lens group G3. Note that the cover glass CG is not limited to a single sheet and multiple sheets may be disposed.

The projection lens system 10 is composed, in order from the screen side, of ten (10) lenses numbered L11 to L13, L21, and L31 to L36 that are grouped into the three lens groups G1 to G3 that respectively have negative, positive, and positive refractive power. This projection lens system 10 is a single-focus type lens system that is incapable of zooming. The third lens group G3 is fixed and does not move, but the first lens group G1 and the second lens group G2 move along the optical axis 100 to adjust the focus (i.e., to perform focusing).

With this projection lens system 10, by making the three lenses L11 to L13 of the first lens group G1 that is closest to the screen 9, i.e., on the enlargement conjugate side 10a, and is where the lens aperture is comparatively large, respectively out of resin, glass, and resin lenses in that order, it is possible to provide a low-cost, wide-angle, and more compact projection lens system 10. Every three lenses could be made of resin to reduce cost, but the negative refractive power would be insufficient and the diameters of the lenses, in particular the diameter of the lens closest to the screen would be larger, which would make it difficult to provide a compact projection lens system. The focal length of every lens could be made shorter to make the lens system compact, but using resin for every lens would mean an increase in curvature, which is undesirable since it makes it difficult to correct aberration and increases the temperature-based variation in lens performance.

In this projection lens system 10, by making the second negative meniscus lens L12 of the first lens group G1 a glass lens with high refractive power, such configuration makes the effective diameters of the two resin lenses L11 and L13 in front and behind comparatively smaller. In addition, without increasing the curvature of the two resin lenses L11 and L13 in front and behind, the projection lens system 10 that is compact and favorably corrects aberration can be provided.

The projection lens system 10 is designed so that the combined focal length f1 of the first lens group G1, the focal length f12 of the second negative meniscus lens L12, the focal length f13 of the negative lens L13, the refractive index n12 of the second negative meniscus lens L12, the radius of curvature R12a of the surface S3 on the screen side of the second negative meniscus lens L12, and the radius of curvature R21b of the surface S8 on the DMD side of the positive lens L21 satisfy the following Conditions (1) to (4).

$$1.0<|f12/f1|<4.0 \quad (1)$$

$$5.0<|f13/f1|<9.0 \quad (2)$$

$$1.75<n12<2.0 \quad (3)$$

$$0.1<|R21b/R12a|<0.8 \quad (4)$$

In the projection lens system 10, by setting the power of the second negative meniscus lens L12 made of glass stronger as indicated by Condition (1), the power of the negative lens L13 made of resin can be made weaker as shown by Condition (2), which suppresses temperature-based variation in lens performance, particularly variation in the back focus. Also, when the power of the second negative meniscus lens L12 has been increased, by using a glass material with a high refractive index as shown by Condition (3), it is possible to avoid a large increase in curvature, which suppresses the production of aberration.

In the projection lens system 10, if the upper limit of Condition (1) is exceeded, the power of the second negative meniscus lens L12 out of the total power of the first lens group G1 becomes weak, which makes it difficult to set the power of the negative lens L13 which is made of resin as weak relative to the power of the first lens group G1 as in the range shown in Condition (2). Accordingly, it becomes difficult to provide a projection lens system that is wide angle and has little variation in back focus due to temperature variation. Although it is preferable for the refractive index n12 of the second negative meniscus lens L12 to be high, by keeping the refractive index n12 within the range of Condition (3), it is possible to prevent excessively high dispersion and to favorably correct chromatic aberration.

In addition, since the second negative meniscus lens L12 of the projection lens system 10 has high negative refractive power, there is a tendency for aberration to occur in the direction of divergence. To compensate the aberration, the surface S8 on the DMD side of the positive lens L21 of the second lens group G2 that is the closest surface being convex on the opposite side (DMD side) to the surface S3 being convex on the screen side, is designed with a radius of curvature R21b that is smaller than the radius of curvature R12a of the surface S3. The aberration in the opposite direction (that is, the direction of convergence) produced using the surface S8 of the positive lens L21 favorably correct the aberration of the second negative meniscus lens L12.

If the upper limit in Condition (1) is exceeded, the power (refractive power) of the second negative meniscus lens L12 becomes weak relative to the power of the first lens group G1, resulting in insufficient negative refractive power. This means that it is difficult to achieve a wide angle for the projection lens system 10. If the upper limit of Condition (2) is exceeded, the power of the negative lens L13 also becomes weak relative to the power of the first lens group G1, resulting in difficulty in achieving a wide angle. If the lower limit of Condition (2) is exceeded, the power of the negative lens L13 becomes strong relative to the power of the first lens group G1, resulting in difficulty in suppressing variation in back focus due to temperature variation for the negative lens L13 which is made of resin.

If the upper limit of Condition (3) is exceeded, the second negative meniscus lens L12 becomes highly dispersive, which makes it difficult to correct chromatic aberration. If the lower limit of Condition (3) is exceeded, the power of the second negative meniscus lens L12 becomes weak, which makes it difficult to achieve a wide angle for the projection lens system 10. If the upper limit of Condition (4) is exceeded, it becomes difficult to correct the aberration caused by the second negative meniscus lens L12. If the lower limit in Condition (4) is exceeded, the power of the surface S8 of the positive lens L21 becomes high and it becomes difficult to correct aberration. In any of such situations, there is a tendency for an increase in various aberrations, including comatic aberration.

As the upper limit of Condition (1), 3.7 is more preferable, 3.5 is even more preferable, and 3.4 is significantly more preferable. As the lower limit of Condition (1), 2.0 is more preferable.

As the upper limit of Condition (2), 8.0 is more preferable. As the lower limit of Condition (2), 5.5 is more preferable, 6.0 is even more preferable, and 6.4 is significantly more preferable.

As the upper limit of Condition (3), 1.9 is more preferable. As the lower limit of Condition (3), 1.78 is more preferable, and 1.80 is significantly more preferable.

As the upper limit of Condition (4), 0.6 is more preferable, 0.5 is even more preferable, and 0.4 is significantly more preferable. As the lower limit of Condition (4), 0.2 is more preferable.

The arrangement in which the positive lens L21 that is made of glass and has high power, the negative lens L13 that is made of resin and has low power, the negative meniscus lens L12 that is made of glass and has high power, and the negative meniscus lens L11 that is made of resin and has low power are disposed in that order from the incident side 10b toward the output side 10a is extremely effective in achieving a wide angle and in correcting aberration for the projection lens system 10.

In addition, the projection lens system 10 is designed so that the center thickness t11c at the optical axis 100 of the first negative meniscus lens L11 and the thickness t11e at an end of the effective diameter of the surface S2 on the DMD side of the first negative meniscus lens L11 satisfy Condition (5) below.

$$4.0 \leq t11e/t11c \leq 5.0 \quad (5)$$

By designing the projection lens system 10 to satisfy the range of Condition (5), it is possible to favorably correct various aberrations including astigmatism. If the upper limit of Condition (5) is exceeded, the thickness t11e at the end of the effective diameter of the first negative meniscus lens L11 becomes large relative to the center thickness t11c, the difference in the amount of light absorbed inside the lens becomes large between the center and the periphery. That causes a significant drop in peripheral brightness. If the lower limit of Condition (5) is exceeded, the thickness t11e at the end of the effective diameter of the first negative meniscus lens L11 becomes small relative to the center thickness t11c, which makes it difficult to correct various aberrations including astigmatism.

In the projection lens system 10, to increase the power of the second negative meniscus lens L12 made of glass, the refractive index n12 of the second negative meniscus lens L12 is set high according to Condition (3), and the correction of chromatic aberration by the second negative meniscus lens L12 with a high refractive index (high dispersion) tends to be insufficient. For this reason, by disposing the two cemented lenses L3B1 and L3B2 in the third lens group G3, the insufficiency in the chromatic aberration correction on the enlargement conjugate side 10a is compensated on the reduction conjugate side 10b. Accordingly, it is possible to provide a projection lens system 10 in which various aberrations including chromatic aberration are favorably corrected.

As shown in FIG. 2, the third lens group G3 is composed, in order from the screen side, of the first cemented lens L3B1 composed of two lenses cemented together, the first biconvex positive lens (positive lens) L33, and a cemented lens L3B2 composed of three lenses cemented together. The first cemented lens L3B1 is disposed on the screen side of the positive lens L33 with no other lens and only one air gap d11 in between, and the second cemented lens L3B2 is disposed on the DMD 2 side of the positive lens L33 with no other lens and only one air gap d13 in between.

The projection lens system 10 is designed so that the radius of curvature R32b of the surface S11 on the DMD side of the negative lens L32 of the first cemented lens L3B1 and the radius of curvature R33a of the surface S12 on the screen side of the positive lens (the first positive biconvex lens) L33 of the third lens group G3 satisfy Condition (6) below.

$$0.89 < R32b/R33a < 1.01 \qquad (6)$$

By designing the projection lens system 10 so that the radii of curvature of the facing surfaces S11 and S12 of the negative lens L32 of the first cemented lens L3B1 and the positive lens L33 are within the range of Condition (6), the two surfaces S11 and S12 that have substantially the same radii of curvature are aligned with the same orientation and are disposed with the smallest or nearly the smallest air gap d11 (in the present embodiment, 0.80 mm) in between without the two surfaces S11 and S12 being cemented together. This means it is possible to achieve a chromatic aberration correcting performance that is close to a triplet and it is additionally possible to achieve a correcting performance for various aberrations including comatic aberration.

FIG. 3 shows data of the respective lenses of the projection lens system 10. FIGS. 4A and 4B show various numerical values for the projection lens system 10. In the lens data, "Ri" represents the radius of curvature (mm) of each lens (i.e., each lens surface) disposed in order from the screen side, "di" represents the distance (mm) between the respective lens surfaces disposed in order from the screen side, "Di" represents the effective diameter (mm) of each lens surface disposed in order from the screen side, "nd" represents the refractive index (d line) of each lens disposed in order from the screen side, and "vd" represents the Abbe number (d line) of each lens disposed in order from the screen side.

In FIG. 3, "Flat" indicates a flat surface. In FIG. 4B, "En" represents "10 to the power n". As one example, "E−06" represents "10 to the power −6", and "E−11" represents "10 to the power −11". Above explanations relating to the lens data are the same in the following embodiments.

Both surfaces S1 and S2 of the first negative meniscus lens L11 disposed closest to the screen 9 in the first lens group G1 and both surfaces S5 and S6 of the negative lens L13 disposed closest to the DMD 2 in the first lens group G1 are aspherical. The aspherical surfaces are expressed by the following expression using the coefficients K, A, B, C, D, E, and F shown in FIG. 4B with X as the coordinate in the optical axis direction, Y as the coordinate in a direction perpendicular to the optical axis, the direction in which light propagates as positive, and R as the paraxial radius of curvature. This is also the case for the embodiments described later.

$$X = (1/R)Y^2/[1 + \{1 - (1+K)(1/R)^2Y^2\}^{1/2}] + AY^4 + BY^6 + CY^8 + DY^{10} + EY^{12}$$

The various values in the equations given in Conditions (1) to (6) described above for the projection lens system 10 according to the present embodiment are as follows.

| | |
|---|---|
| $\|f12/f1\|=3.4$ | Condition (1) |
| $\|f13/f1\|=6.0$ | Condition (2) |
| $n12=1.8010$ | Condition (3) |
| $\|R21b/R12a\|=0.31$ | Condition (4) |
| $t11e/t11c=4.0$ (where $t11e=16.0$ mm, $t11c=4.0$ mm) | Condition (5) |
| $R32b/R33a=1.009$ | Condition (6) |

Figure 5A:
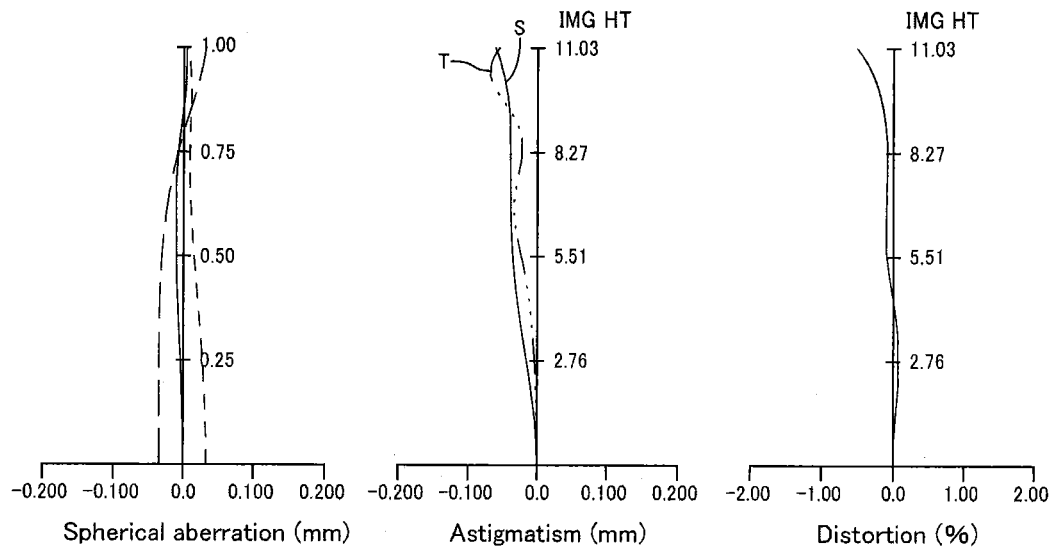
FIGS. 5A and 5B are aberration graphs of the projection lens system according to the first embodiment, with FIG. 5A showing longitudinal aberration and FIG. 5B showing lateral aberration.
Figure 5B:
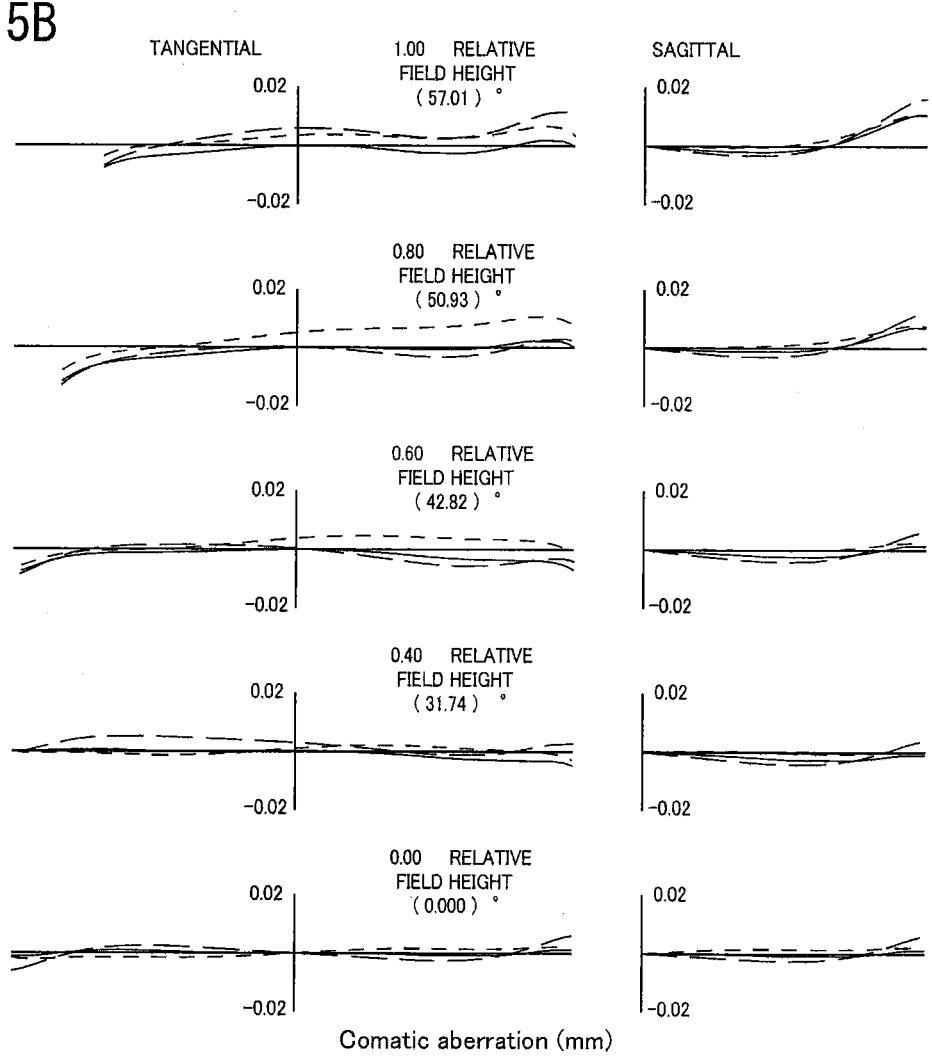

FIGS. 5A and 5B are graphs showing longitudinal aberration and lateral aberration of the projection lens system 10. As shown in FIGS. 5A and 5B, various aberrations are all favorably corrected and it is possible to project large, high-quality images onto the screen 9. Note that spherical aberration is shown for the respective wavelengths of 630 nm (dotted line), 550 nm (solid line), 460 nm (dashed line). In addition, astigmatism and comatic aberration are respectively shown for tangential rays (T) and sagittal rays (S). This is also the case for the embodiments described later.

The projection lens system 10 according to the first embodiment has a simple and compact construction with 10 lenses and a maximum diameter of around 70 mm, but is wide-angle with an angle of view of 114.2 degrees (a half angle of view of 57.1 degrees) and a focal length of 7.11, and is capable, with an f number of 2.79, of projecting bright and sharp images, making it one example of a projection lens system 10 with a favorable balance between cost and performance.

Second Embodiment

Figure 6:
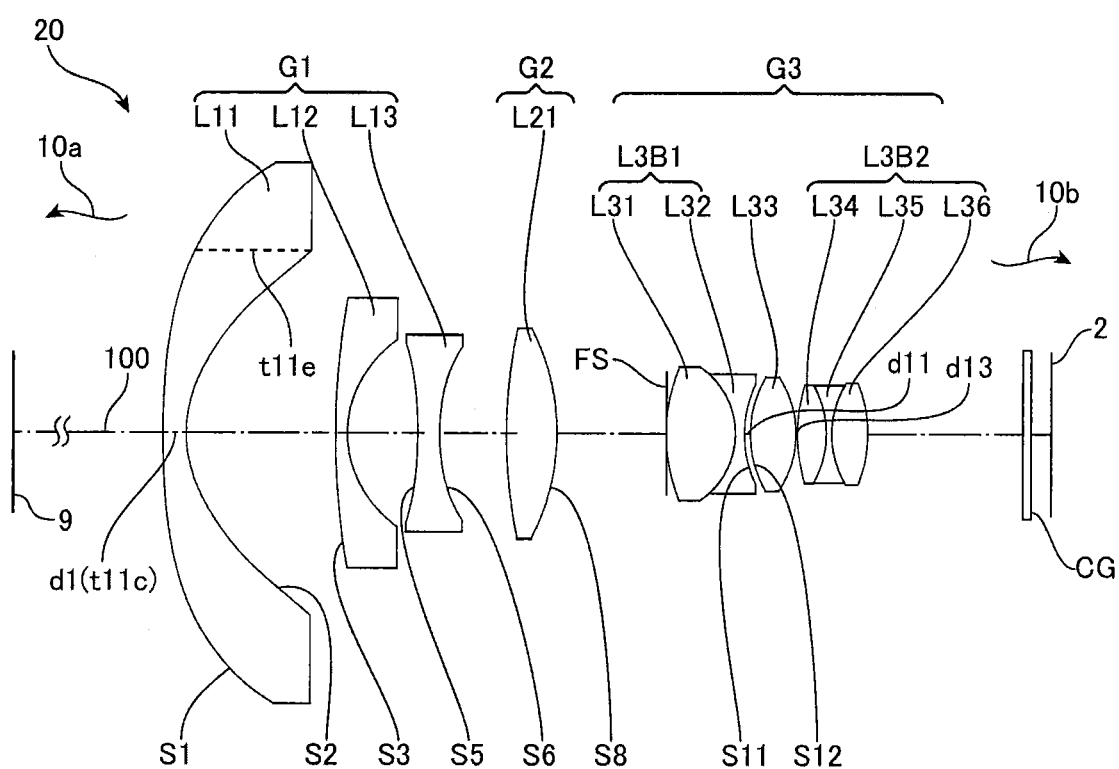
FIG. 6 is a diagram showing the overall arrangement of a projection lens system according to a second embodiment of the present invention.

FIG. 6 shows a projection lens system 20 according to a second embodiment of the present invention. The projection lens system 20 is also composed, in order from the screen side, of ten lenses numbered L11 to L13, L21, and L31 to L36 that are grouped into the three lens groups G1 to G3 that respectively have negative, positive, and positive refractive power. Since the composition of the lens groups G1 to G3 and the forms of the respective lenses included in the lens groups G1 to G3 are the same as in the first embodiment, detailed description of the individual lenses is omitted. This is also the case for the embodiments described later.

FIG. 7 shows data on the respective lenses of the projection lens system 20. FIGS. 8A and 8B show various numerical values for the projection lens system 20. The various values in the equations given in Conditions (1) to (6) described above for the projection lens system 20 according to the present embodiment are as follows.

| | |
|---|---|
| $\|f12/f1\|=3.3$ | Condition (1) |
| $\|f13/f1\|=6.5$ | Condition (2) |
| $n12=1.8010$ | Condition (3) |
| $\|R21b/R12a\|=0.29$ | Condition (4) |
| $t11e/t11c=5.0$ (where $t11e=15.0$ mm, $t11c=3.0$ mm) | Condition (5) |
| $R32b/R33a=1.008$ | Condition (6) |

Figure 9A:
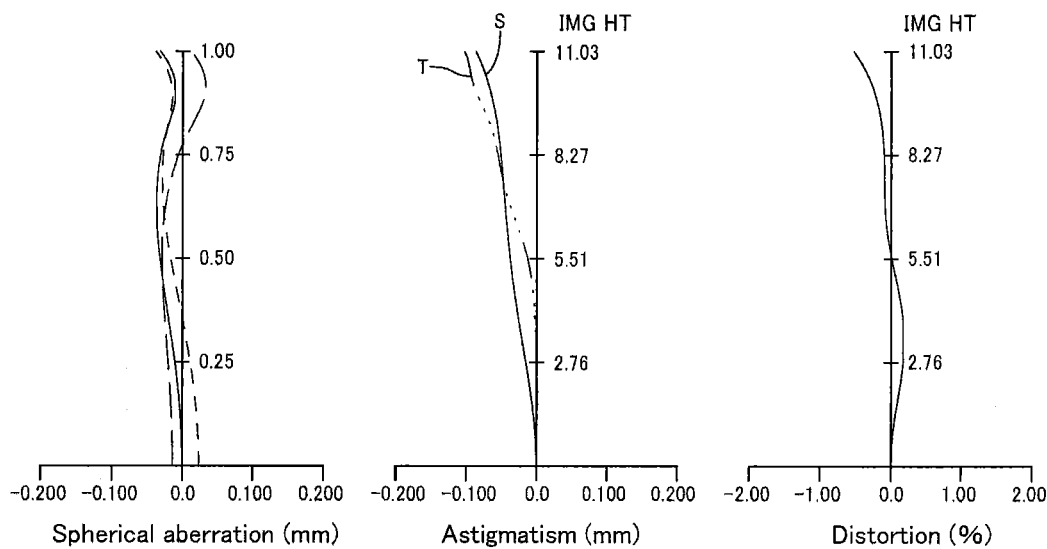
FIGS. 9A and 9B are aberration graphs of the projection lens system according to the second embodiment, with FIG. 9A showing longitudinal aberration and FIG. 9B showing lateral aberration.
Figure 9B:
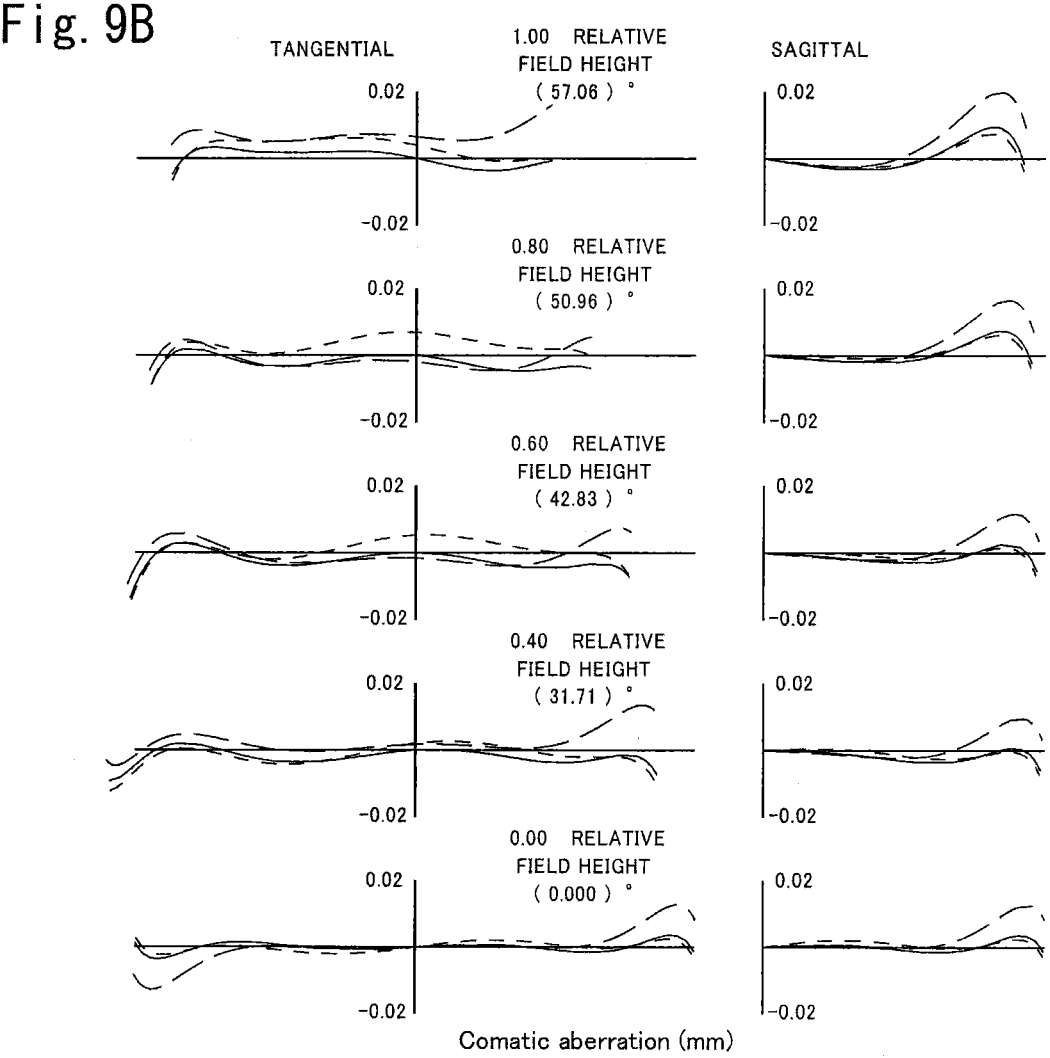

FIGS. 9A and 9B are graphs showing longitudinal aberration and lateral aberration of the projection lens system 20. As shown in FIGS. 9A and 9B, various aberrations are all favorably corrected so that it is possible to project large, high-quality images onto the screen 9.

In this way, the projection lens system 20 increases the ratio between the center thickness t11c and the effective diameter end thickness t11e of the first negative meniscus lens compared to the first embodiment to improve Condition (5). This means that it is possible to provide a high performance projection lens system 20 capable, with an F number of 2.3, of obtaining even brighter and sharp images.

Third Embodiment

Figure 10:
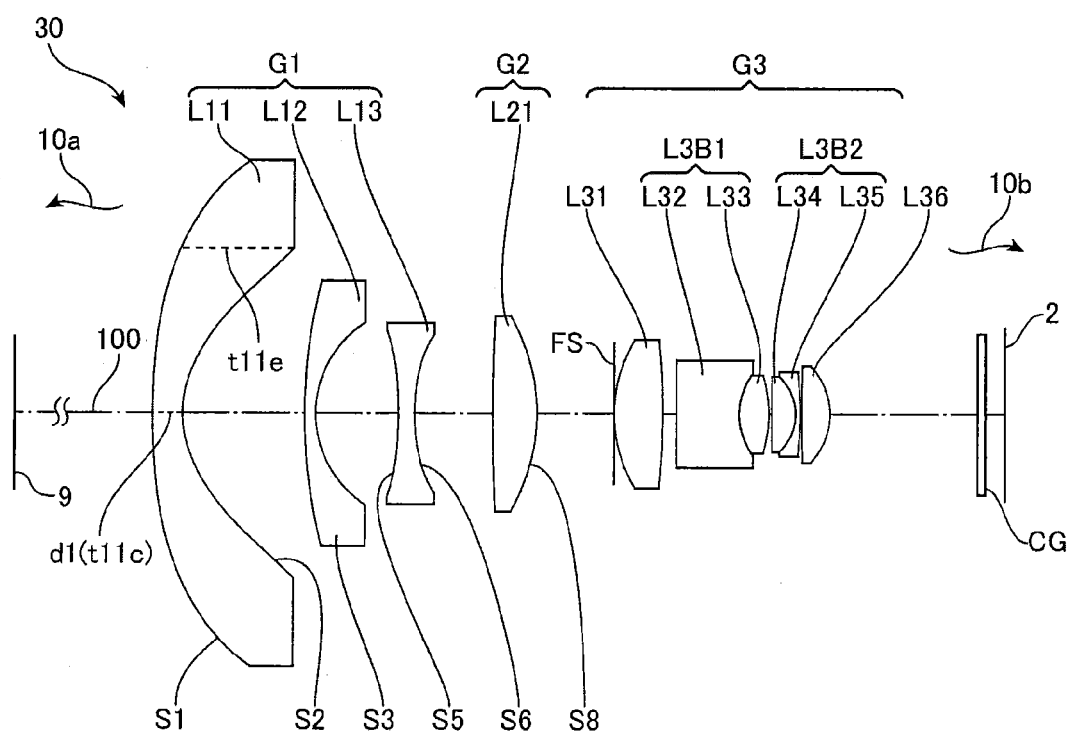
FIG. 10 is a diagram showing the overall arrangement of a projection lens system according to a third embodiment of the present invention.

FIG. 10 shows a projection lens system 30 according to a third embodiment of the present invention. The projection lens system 30 is also composed, in order from the screen side, of ten lenses numbered L11 to L13, L21, and L31 to L36 that are grouped into the three lens groups G1 to G3 that respectively have negative, positive, and positive refractive power.

The third lens group G3 is composed, in order from the screen side, of a positive biconvex lens (first positive biconvex lens) L31, a first cemented lens (balsam lens, doublet) L3B1 composed of two lenses cemented together, a second cemented lens (balsam lens, doublet) L3B2 composed of two lenses cemented together, and a positive biconvex lens (second positive biconvex lens) L36. The first cemented lens L3B1 is composed, in order from the screen side, of a negative meniscus lens L32 that is convex on the screen side and a positive biconvex lens L33. The second cemented lens L3B2 is composed, in order from the screen side, of a positive biconvex lens L34 and a negative meniscus lens L35 that is convex on the DMD side.

In this way, in the projection lens system 30, two cemented lenses L3B1 and L3B2 that are both composed of two lenses cemented together and the second positive lens L36 are disposed in the third lens group G3.

FIG. 11 shows data on the respective lenses of the projection lens system 30. FIGS. 12A and 12B show various numerical values for the projection lens system 30. The various values in the equations given in Conditions (1) to (5) described above for the projection lens system 30 according to the present embodiment are as follows.

| $|f12/f1|=3.6$ | Condition (1) |
| $|f13/f1|=6.1$ | Condition (2) |
| $n12=1.8010$ | Condition (3) |
| $|R21b/R12a|=0.37$ | Condition (4) |
| $t11e/t11c=4.0$ (where $t11e=16.0$ mm, $t11c=4.0$ mm) | Condition (5) |

Figure 13A:
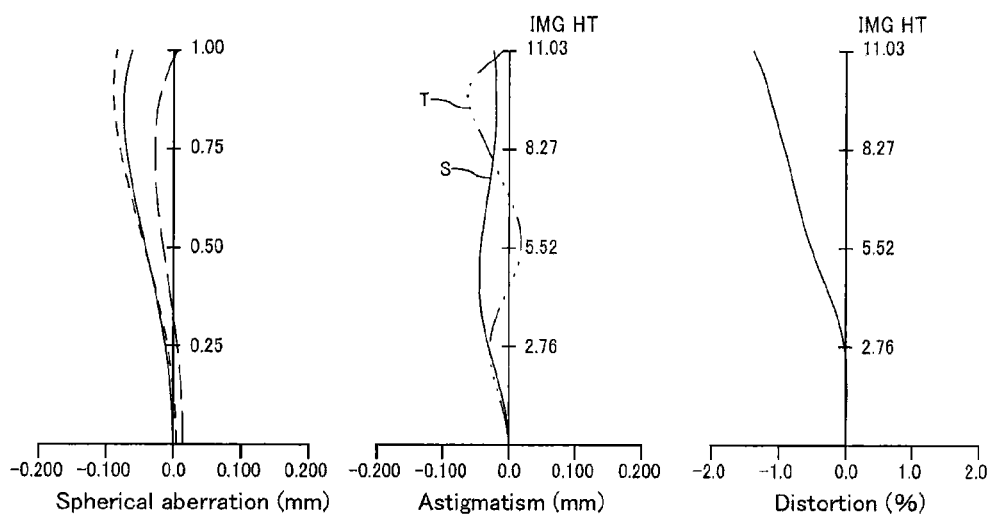
FIGS. 13A and 13B are aberration graphs of the projection lens system according to the third embodiment, with FIG. 13A showing longitudinal aberration and FIG. 13B showing lateral aberration.
Figure 13B:
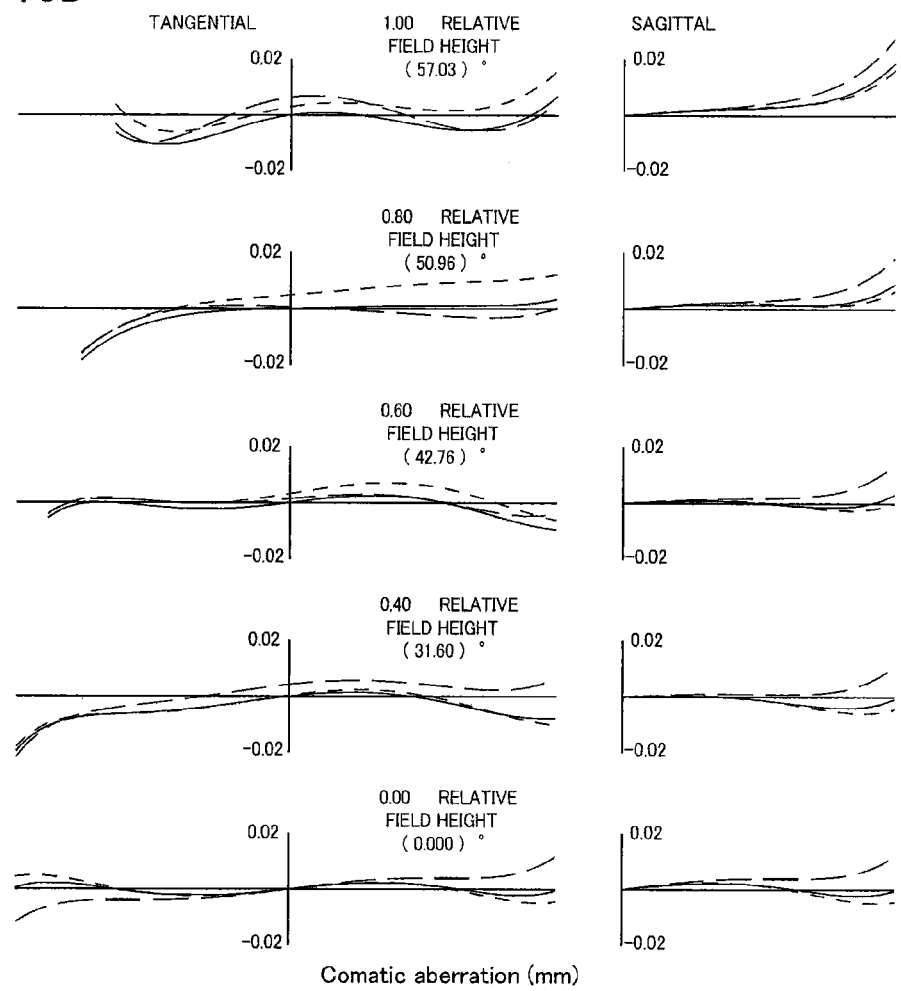

FIGS. 13A and 13B are graphs showing longitudinal aberration and lateral aberration of the projection lens system 30. As shown in FIGS. 13A and 13B, various aberrations are all favorably corrected so that it is possible to project large, high-quality images onto the screen 9.

Accordingly, with the projection lens system 30, by changing the combination of lenses that are cemented together in the first cemented lens L3B1 and the second cemented lens L3B2 of the third lens group G3, it is possible to omit the cemented lens composed of three lens cemented together, making this one example of a low-cost projection lens system 30.

Fourth Embodiment

Figure 14:
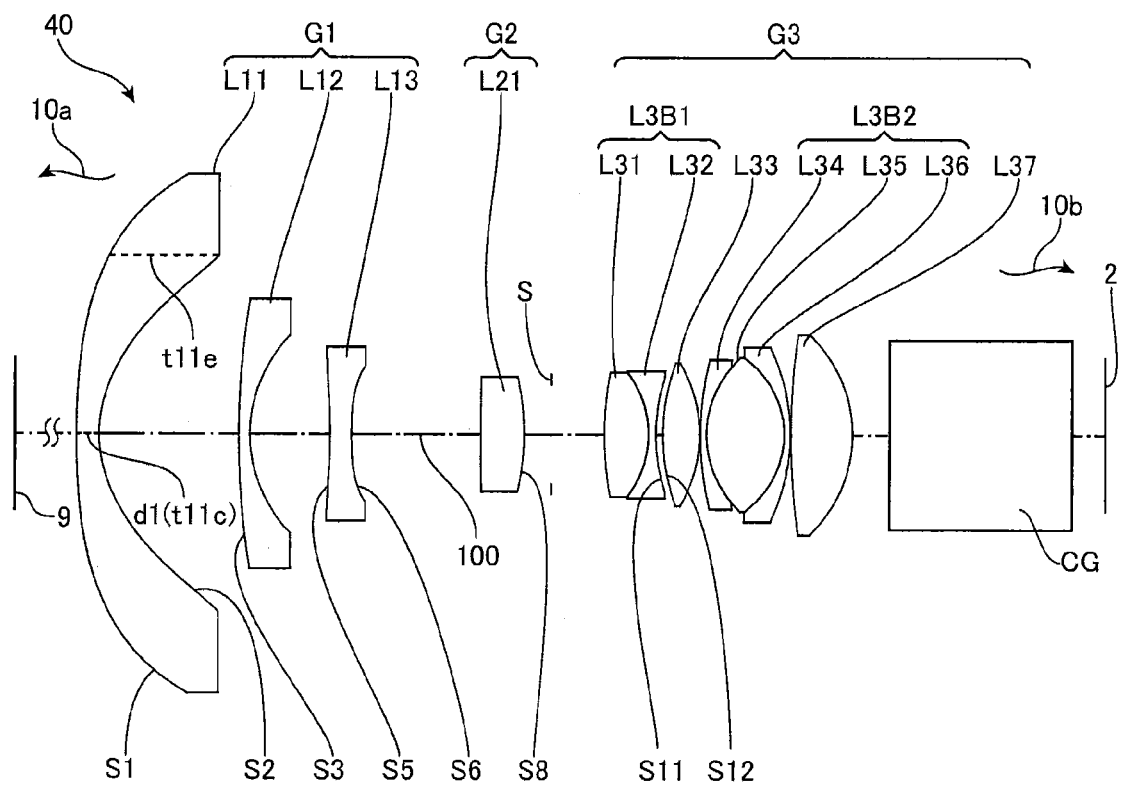
FIG. 14 is a diagram showing the overall arrangement of a projection lens system according to a fourth embodiment of the present invention.

FIG. 14 shows a projection lens system 40 according to a fourth embodiment of the present invention. The projection lens system 40 is composed, in order from the screen 9 side, of eleven lenses numbered L11 to L13, L21, and L31 to L37 that are grouped into the three lens groups G1 to G3 that respectively have negative, positive, and positive refractive power. For use of the projection lens system 40, an integrator such as a fly's eye lens and a TIR prism are used and the projection light 92 that is incident to the projection lens system 40 is telecentric.

The third lens group G3 is composed, in order from the screen side, of a first cemented lens L3B1 composed of two lenses cemented together, a positive biconvex lens (first positive biconvex lens) L33, a cemented lens L3B2 composed of three lenses cemented together, and a positive biconvex lens (second biconvex positive lens) L37. The first cemented lens L3B1 is composed, in order from the screen side, of a positive biconvex lens L31 and a negative biconcave lens L32. The second cemented lens L3B2 is composed, in order from the screen side, of a negative meniscus lens L34 that is convex on the screen side, a positive biconvex lens L35, and a negative meniscus lens L36 that is convex on the DMD side.

In this way, in the projection lens system 40, the positive lens (second positive lens) L37 is additionally disposed on the DMD side of the second cemented lens L3B2 of the third lens group G3. A stop S is disposed on the screen side of the third lens group G3. A cover glass CG made of a single sheet of glass with a large thickness d20, in the present embodiment 25.00 mm is disposed on the DMD 2 side of the third lens group G3.

FIG. 15 shows data on the respective lenses of the projection lens system 40. FIGS. 16A and 16B show various numerical values for the projection lens system 40. The various values in the equations given in Conditions (1) to (6) described above for the projection lens system 40 according to the present embodiment are as follows.

| $|f12/f1|=3.5$ | Condition (1) |
| $|f13/f1|=6.5$ | Condition (2) |
| $n12=1.8010$ | Condition (3) |
| $|R21b/R12a|=0.30$ | Condition (4) |
| $t11e/t11c=5.0$ (where $t11e=15.0$ mm, $t11c=3.0$ mm) | Condition (5) |
| $R32b/R33a=0.89$ | Condition (6) |

Figure 17A:
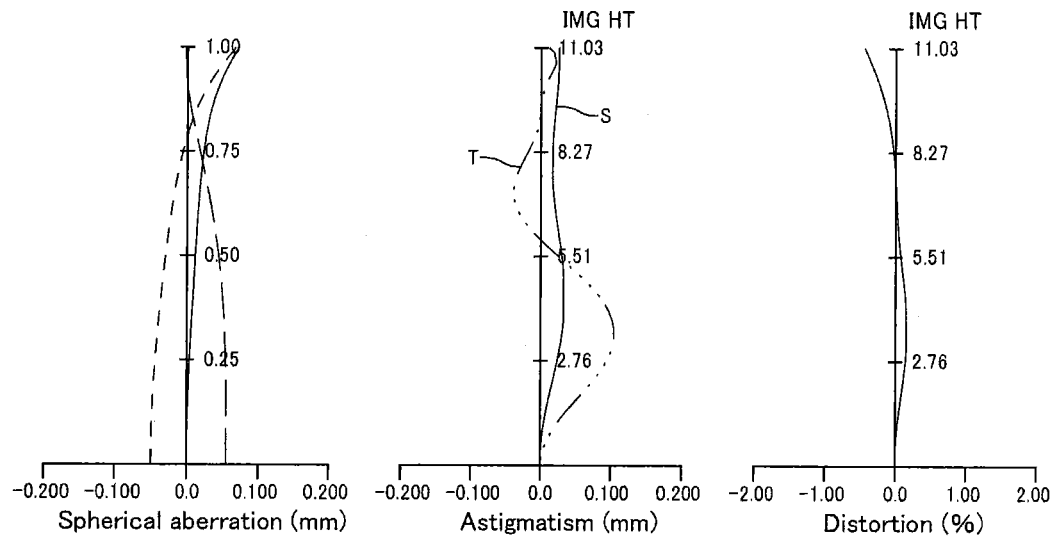
FIGS. 17A and 17B are aberration graphs of the projection lens system according to the fourth embodiment, with FIG. 17A showing longitudinal aberration and FIG. 17B showing lateral aberration.
Figure 17B:
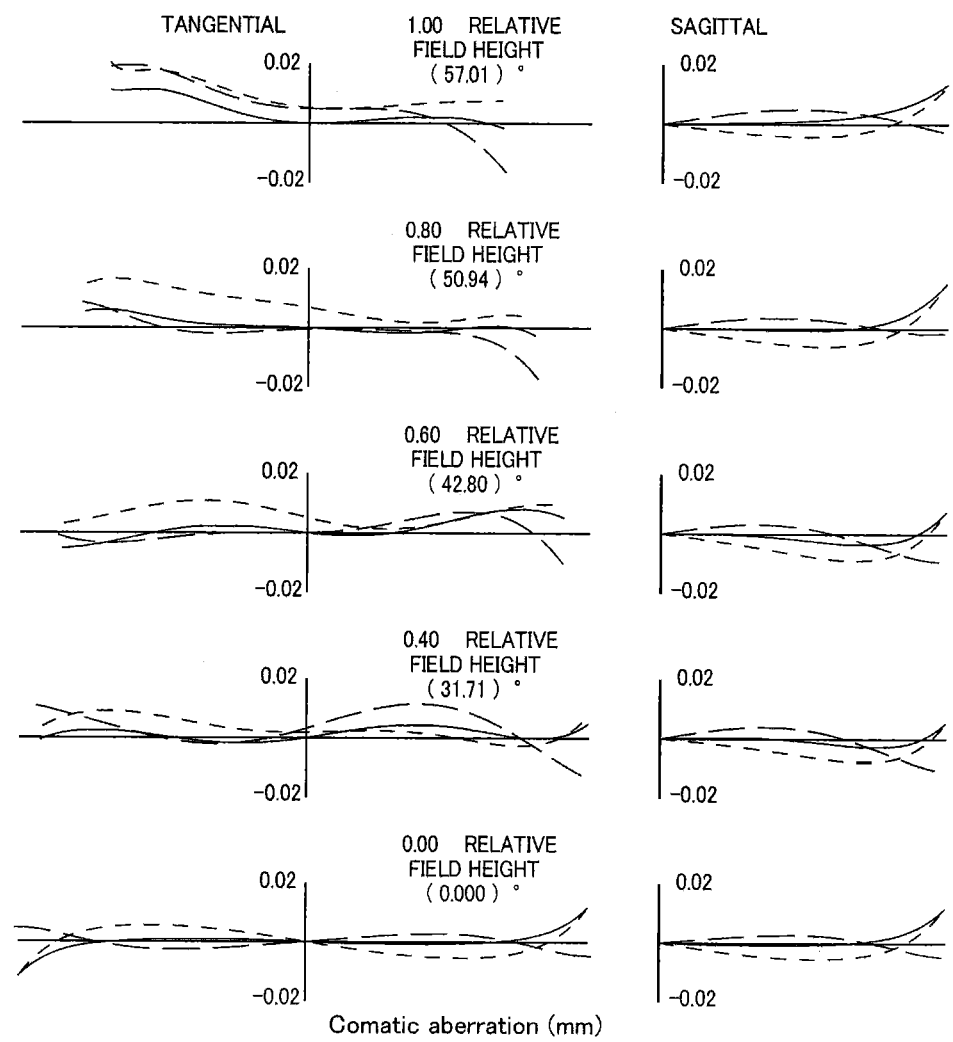

FIGS. 17A and 17B are graphs showing longitudinal aberration and lateral aberration of the projection lens system 40. As shown in FIGS. 17A and 17B, various aberrations are all favorably corrected so that it is possible to project large, high-quality images onto the screen 9.

The projection lens system 40 that has the second positive lens L37 on the DMD side of the second cemented lens L3B2 of the third lens group G3 is favorable for making the incident projection light 92 telecentric or near-telecentric and obtaining sharp images even if the projector 1 is slightly moved in the direction of the optical axis 100.

Note that the present invention is not limited to the embodiments described above and is defined by the scope of the appended patent claims. The projection lens system 10 (20, 30, 40) according to the present invention can also be installed in a three-panel projector capable of splitting light from the white light source 4 into three colors using dichroic filters (mirrors) or the like. The light modulator 2 may be an LCD (Liquid Crystal Display) panel and may be a single panel that reproduces images of the respective colors using time division or may have images of the respective colors combined using a dichroic prism or the like.

What is claimed is:

1. A projection lens system that projects projection light from a light modulator onto a screen, comprising, in order from a screen side thereof, a first lens group with negative refractive power, a second lens group with positive refractive power, and a third lens group with positive refractive power, wherein the first lens group includes, in order from the screen side, a first negative meniscus lens that is made of resin and is convex on the screen side, a second negative meniscus lens that is made of glass and is convex on the screen side, and a negative biconcave lens made of resin, both surfaces of the first negative meniscus lens and of the negative biconcave lens being aspherical, the second lens group consists of a positive biconvex lens made of glass, and a combined focal length f1 of the first lens group, a focal length f12 of the second negative meniscus lens of the first lens group, a focal length f13 of the negative biconcave lens of the first lens group, a refractive index n12 of the second negative meniscus lens of the first lens group, a radius of curvature R12$a$ of a surface on the screen side of the second negative meniscus lens of the first lens group, and a radius of curvature R21$b$ of a surface on a light modulator side of the positive biconvex lens of the second lens group satisfy following conditions $1.0<|f12/f1|<4.0$, $5.0<|f13/f1|<9.0$, $1.74<n12<2.0$, and $0.1<R21b/R12a<0.8$.

2. The projection lens system according to claim 1, wherein following conditions are also satisfied $2.0<|f12/f1|<3.5$, $6.0<|f13/f1|<8.0$, $1.80<n12<2.0$, and $0.2<|R21b/R12a|<0.5$.

3. The projection lens system according to claim 1, wherein a thickness t11$c$ at a center of the first negative meniscus lens of the first lens group and a thickness t11$e$ at an end of an effective diameter of a surface on the light modulator side of the first negative meniscus lens of the first lens group satisfy following condition $4.0 \leq t11e/t11c \leq 5.0$.

4. The projection lens system according to claim 1, wherein the third lens group includes a first cemented lens, a second cemented lens and a first positive biconvex lens.

5. The projection lens system according to claim 4, wherein the first cemented lens is disposed on the screen side of the first positive biconvex lens with one air gap in between and the second cemented lens is disposed on the light modulator side of the first positive biconvex lens with at least one air gap in between, the first cemented lens consists of, in order from the screen side, a positive biconvex lens and a negative biconcave lens, and a radius of curvature R32$b$ of a surface on the light modulator side of the negative biconcave lens of the first cemented lens of the third lens group and the radius of curvature R33$a$ of a surface on the screen side of the first positive biconvex lens of the third lens group satisfy the following condition $0.89<R32b/R33a<1.01$.

6. The projection lens system according to claim 5, wherein the second cemented lens consists of, in order from the screen side, a negative meniscus lens that is convex on the screen side, a positive biconvex lens, and a negative meniscus lens that is convex on the light modulator side, and the third lens group further includes a second positive biconvex lens that is disposed on the light modulator side of the second cemented lens.

7. The projection lens system according to claim 4, wherein the first cemented lens is disposed on the light modulator side of the first positive lens and the second cemented lens is disposed on the light modulator side of the first cemented lens, the first cemented lens includes, in order from the screen side, a negative meniscus lens that is convex on the screen side and a positive biconvex lens, the second cemented lens includes, in order from the screen side, a positive biconvex lens and a negative meniscus lens that is convex on the light modulator side, and the third lens group further includes a second biconvex positive lens that is disposed on the light modulator side of the second cemented lens.

8. A projector comprising:
a projection lens system according to claim 1; and
a light modulator that modulates illumination light and supplies modulated illumination light to the projection lens system.

* * * * *

UNITED STATES PATENT AND TRADEMARK OFFICE
CERTIFICATE OF CORRECTION

PATENT NO. : 8,437,093 B2
APPLICATION NO. : 13/444473
DATED : May 7, 2013
INVENTOR(S) : Takahiko Matsuo It is certified that error appears in the above-identified patent and that said Letters Patent is hereby corrected as shown below:

In the Claims

In Claim 1, at Column 13, Line 18 reads "$1.74 < n12 < 2.0$, and"
  Should read -- $1.75 < n12 < 2.0$, and --

In Claim 1, at Column 13, Line 19 reads: "$0.1 < R21b/R12a| < 0.8$"
  Should read -- $0.1 < |R21b/R12a| < 0.8$ --

Signed and Sealed this
Eighteenth Day of February, 2014

Michelle K. Lee
*Deputy Director of the United States Patent and Trademark Office*